Patented Dec. 26, 1950

2,535,175

UNITED STATES PATENT OFFICE 2,535,175

NITROALKANEPHOSPHONATES

Pliny O. Tawney, Passaic, N. J., assignor to United States Rubber Company, New York, N. Y., a corporation of New Jersey No Drawing. Application May 11, 1949, Serial No. 92,740

7 Claims. (Cl. 260—461)

This invention relates to certain new organophosphorus compounds and to a method of preparing them. More particularly, the invention relates to compounds resulting from the alkaline catalyzed addition of primary and secondary nitroalkanes to esters of ethene-phosphonic acid.

It is an object of my invention to provide new and useful organophosphorus compounds. Another object is to provide a method for the synthesis of such compounds.

The compounds obtained from the practice of my invention are useful as intermediates in the synthesis of other chemicals, and as plasticizers, insecticides, heat transfer agents, lubricants, hydraulic fluids and textile-treating materials.

It is known that, in the presence of alkaline catalysts, compounds containing an active or acidic hydrogen atom may undergo addition reactions with various ethylenically unsaturated compounds such as esters of alpha-unsaturated carboxylic acids, in which the ethylenically unsaturated group is activated by virtue of its conjugated relationship to the carbonyl group. I have now discovered that primary and secondary nitroalkanes will undergo addition reaction with ethylenically unsaturated compounds in which the ethylenic group is in conjugated relationship to the group

It has not heretofore been known that ethenephosphonic acid esters would behave in this way. Specifically, I have discovered that primary and secondary nitroalkanes will react with esters of ethenephosphonic acid to give a series of new and useful organophosphorus compounds. The reaction may be illustrated by the following equation:

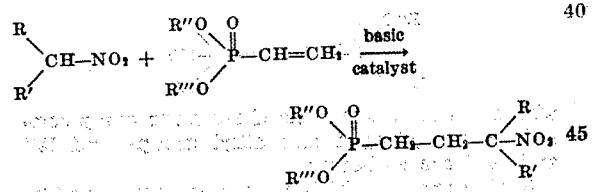

where R and R' are selected from the class consisting of hydrogen and alkyl groups and R'' and R''' are selected from the class consisting of alkyl, aryl, alkaryl and aralkyl groups.

Any aliphatic saturated primary or secondary nitroalkane may be used in the practice of my invention. Examples are nitromethane, nitroethane, 2-nitropropane, 1-nitrobutane, 2-nitrobutane and the primary and secondary nitropentanes, nitrohexanes, nitrooctanes, and higher nitroalkanes. Usually the nitroalkane will contain from 1 to 20 carbon atoms per molecule.

A wide variety of esters of ethenephosphonic acid may be used in the practice of my invention. The substituent groups, R'' and R''' in the above equation, may be the same or different. Examples of alkyl groups include methyl, ethyl, isopropyl, n-butyl, sec.-amyl, hexyl, etc. Examples of aryl groups include phenyl, biphenyl, naphthyl, etc. Examples of alkaryl groups include xylyl, tolyl, ethyl-phenyl, etc., while examples of aralkyl groups include benzyl, phenylethyl, etc.

The reaction is typically effected by heating a mixture of the nitroalkane and the ester of ethenephosphonic acid in the presence of a basic catalyst at an elevated temperature which may conveniently range from 40° to 150° C., a temperature of from 80° to 100° C. often being preferred. It is often preferred to carry out the reaction under reflux conditions. The pressure is usually atmospheric although superatmospheric pressures may be used.

It is preferred to have present in the reaction mixture a suitable solvent in order to keep the reaction mixture fluid. The lower aliphatic saturated monohydric alcohols, e. g., methanol, ethanol, isopropanol, etc., are particularly useful in this respect. Because such alcohols are polar solvents they readily dissolve the alkali metal salts of the nitroalkanes, the preferred catalysts for the reaction. Such a salt may advantageously be formed by dissolving sodium in the alcohol to form the sodium alcoholate and then adding the nitroalkane to the resulting solution. Because the nitroalkanes are more acidic than the alcohols the sodium salt of the nitroalkane is formed. Furthermore, if the reaction be carried out in the presence of a solvent, the temperature may advantageously be maintained at the temperature of reflux and no additional control of the rate of heating is needed.

Instead of alcohol, any other suitable organic solvent may be used. Preferably the solvent is inert with respect to and a mutual solvent for the other materials present in the reaction mixture.

It is preferred to use an amount of the nitroalkane at least equal to that amount which is stoichiometrically equivalent to the ester of ethenephosphonic acid. This insures complete utilization of the relatively expensive ethenephosphonic acid ester reactant.

The preferred catalyst is an alkali metal salt of the nitroalkane used as a reactant. This catalyst is most conveniently made, as stated above, by dissolving the alkali metal in a suitable excess of the solvent, alcohol, and adding the nitroalkane to the resulting solution of the alkali metal alcoholate in the excess alcohol. Sodium metal is preferred for this purpose. However, other alkali metals such as potassium, lithium, etc. may be used.

Less preferably other basic materials may be used as catalysts in carrying out the addition reaction of the present invention. Examples include oxides and hydroxides of alkali metals, oxides and hydroxides of alkaline earth metals such as calcium, barium, strontium, etc., and organic bases, e. g., amines such as pyridine, piperidine, various quaternary ammonium hydroxides such as trimethyl benzyl ammonium hydroxide, etc.

The reaction is preferably carried out under substantially anhydrous conditions which are easily attained by the use of anhydrous reactants and by carrying out the reaction in such a manner that access of extraneous moisture is prevented.

The reaction is preferably continued until the ester of ethenephosphonic acid has been substantially completely combined. The duration of the reaction may vary widely. Following the attainment of the desired completeness of reaction, the addition reaction product is recovered from the reaction mixture in any suitable manner. In the case of the lower-boiling products, their recovery may conveniently be effected by vacuum distillation.

The following examples disclose my invention in more detail. All parts are by weight.

Example 1

To a solution of 0.1 part of sodium in 40 parts of absolute ethyl alcohol there are added 25 parts of nitromethane and 20 parts of diethyl ethenephosphonate. This reaction mixture is heated under reflux at approximately 80° C. for 18 hours. It is then mixed with 350 parts of absolute diethyl ether containing 2 parts of glacial acetic acid. The solution is filtered to remove the insoluble precipitate of sodium acetate and the alcohol and ether are removed in vacuo. The residue is distilled in a molecular still at a pressure of from 6 to 15 microns with the temperature of the surrounding heating bath ranging from 60° C. to 100° C. Seven parts of colorless distillate are obtained. The product is a new compound, diethyl 3-nitropropanephosphonate.

| Analysis: | Percent P | Percent N |
|---|---|---|
| Found | 13.51 | 6.09 |
| Theory | 13.75 | 6.22 |

Example 2

To a solution of 0.5 part of sodium in 120 parts of absolute ethyl alcohol there are added 13.3 parts of 2-nitropropane and 16.4 parts of diethyl ethenephosphonate. The mixture is then heated under reflux for 16 hours. The alcohol is removed by distillation in vacuo and the residue is dissolved in 90 parts of absolute diethyl ether. To this solution there are added 1.5 parts of glacial acetic acid and the resulting precipitate of sodium acetate is removed by filtration. The ether is removed from the filtrate in vacuo. The residue consists of 24.4 parts of an amber colored liquid which on distillation yields 14.0 parts of a pale-yellow liquid, diethyl 3-methyl-3-nitrobutanephosphonate, B. P. 120–123° C./0.2 mm., $N_D^{20} = 1.4477$.

| Analysis: | Percent P | Percent N |
|---|---|---|
| Found | 12.30 | 5.56 |
| Theory | 12.33 | 5.53 |

The amount of catalyst required to effect the reaction is very small, commonly ranging from 0.01 mole to 0.20 mole per mole of the ester of ethenephosphonic acid.

Having thus described my invention, what I claim and desire to protect by Letters Patent is:

1. The process which comprises effecting addition reaction of a compound selected from the group consisting of primary and secondary nitroalkanes with an ester of ethenephosphonic acid having the formula

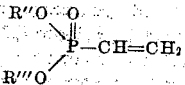

where R'' and R''' are selected from the class consisting of alkyl, aryl, alkaryl and aralkyl groups in the presence of a basic catalyst selected from the group consisting of the alkali metal salts of said nitroalkane, alkali metal oxides and hydroxides, alkaline earth metal oxides and hydroxides, pyridine, piperidine, and quaternary ammonium hydroxides and thereby forming a compound having the formula

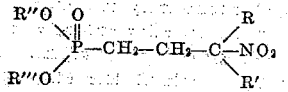

where R and R' are selected from the group consisting of hydrogen and alkyl groups and R'' and R''' are as before.

2. The process which comprises effecting addition reaction of a compound selected from the group consisting of primary and secondary nitroalkanes with an ester of ethenephosphonic acid having the formula

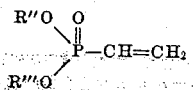

where R'' and R''' are selected from the class consisting of alkyl, aryl, alkaryl and aralkyl groups by heating a mixture of said nitroalkane, said ester and an alkali metal salt of said nitroalkane, and thereby forming a compound having the formula

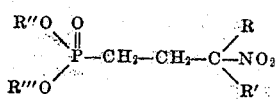

where R and R' are selected from the group consisting of hydrogen and alkyl groups and R'' and R''' are as before.

3. The process which comprises effecting additional reaction of 2-nitropropane and diethyl ethenephosphonate in the presence of an alkali metal salt of 2-nitropropane as a catalyst and thereby forming a compound having the formula

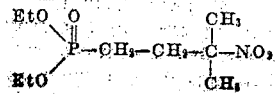

4. The process which comprises effecting addition reaction of nitromethane and diethyl ethenephosphonate in the presence of an alkali metal salt of nitromethane as a catalyst and thereby forming a compound having the formula

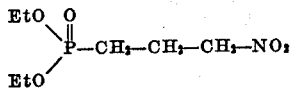

5. A new chemical compound having the formula

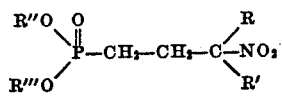

where R and R' are selected from the group consisting of hydrogen and alkyl groups and R'' and R''' are selected from the group consisting of alkyl, aryl, alkaryl and aralkyl groups.

6. As a new chemical compound, diethyl 3-nitropropanephosphonate.

7. As a new chemical compound, diethyl 3-methyl-3-nitrobutanephosphonate.

PLINY O. TAWNEY.

No references cited.